US008600357B2

(12) United States Patent  (10) Patent No.: US 8,600,357 B2
Sterlino  (45) Date of Patent: Dec. 3, 2013

(54) MASS NOTIFICATION SYSTEM

(76) Inventor: Dustin J. Sterlino, Oakley, CA (US)

( * ) Notice: Subject to any disclaimer, the term of this patent is extended or adjusted under 35 U.S.C. 154(b) by 859 days.

(21) Appl. No.: 12/262,026

(22) Filed: Oct. 30, 2008

(65) Prior Publication Data

US 2009/0117926 A1 May 7, 2009

Related U.S. Application Data

(60) Provisional application No. 60/985,183, filed on Nov. 2, 2007.

(51) Int. Cl.
H04M 1/725 (2006.01)
H04M 11/04 (2006.01)
G06F 15/16 (2006.01)

(52) U.S. Cl.
USPC ............... 455/412.2; 455/404.2; 709/203; 709/207; 340/539.2

(58) Field of Classification Search
None
See application file for complete search history.

(56) References Cited

U.S. PATENT DOCUMENTS

| | | | |
|---|---|---|---|
| 5,878,116 A | 3/1999 | Scott | |
| 5,912,947 A * | 6/1999 | Langsenkamp et al. | 379/69 |
| 5,955,952 A | 9/1999 | Bergman | |
| 6,067,018 A | 5/2000 | Skelton | |
| 6,283,065 B1 | 9/2001 | Shorrock | |
| 6,401,095 B1 * | 6/2002 | Adler | 1/1 |
| 6,505,203 B1 * | 1/2003 | Adler | 1/1 |
| 6,816,878 B1 * | 11/2004 | Zimmers et al. | 709/200 |
| 7,198,010 B2 | 4/2007 | Meadows | |
| 7,409,428 B1 | 8/2008 | Brabec | |
| 7,617,287 B2 * | 11/2009 | Vella et al. | 709/207 |
| 2004/0103158 A1 * | 5/2004 | Vella et al. | 709/206 |
| 2006/0049934 A1 | 3/2006 | Breen | |
| 2006/0224625 A1 | 10/2006 | Warner | |
| 2008/0018453 A1 * | 1/2008 | Adler | 340/531 |

OTHER PUBLICATIONS

US Patent 990,638 to Deakin Apr. 25, 1911, file—990638_A_COPARTNERSHIP.*

* cited by examiner

*Primary Examiner* — Jinsong Hu
*Assistant Examiner* — William Nealon
(74) *Attorney, Agent, or Firm* — Hickman Palermo Truong Becker Bingham Wong LLP; Kirk D. Wong

(57) ABSTRACT

A method is disclosed for mass population notification of lost items. A user indicates a location in the proximity of where an item was lost and can also enter information describing the lost item and possibly upload a picture of the item. The user can select how many residents that he wants to notify about the lost item. The user's item description and contact information is processed to create a short voice message and/or text message to be delivered to the residents around the location where his item was lost. A map can be displayed to the user that graphically displays the area that is covered by the phone numbers found or an estimate of the phone number coverage selected by the user.

20 Claims, 5 Drawing Sheets

Fig. 2

MASS NOTIFICATION SYSTEM

PRIORITY CLAIM

This application claims benefit of Provisional Appln. 60/985,183, filed Nov. 2, 2007, the entire contents of which is hereby incorporated by reference as if fully set forth herein, under 35 U.S.C. §119(e).

TECHNICAL FIELD

The present disclosure generally relates to mass population notification of lost personal items.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Pets, personal items, and people are lost on a daily basis. The problem that arises is how to find the lost item. The only alternatives that are currently available for a person to notify a large number of people about the loss is by posting fliers across a neighborhood, placing an ad in a newspaper, posting a lost and found message on an online bulletin board, or, for missing children, having the local authorities issue an Amber alert.

These avenues of notification are reliant upon someone actively looking for the notification. For example, searching a neighborhood for a flier posted on a lamp post in the neighborhood, purchasing a newspaper and looking for the ad, having a computer to search for an online posting, or driving on a freeway to see the Amber alert. These are passive approaches that typically require the knowledge of something being lost by the observers.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a block diagram that illustrates a user interface screen for selecting a number of neighbors to contact, according to an embodiment of the invention;

DETAILED DESCRIPTION

Figure 1:
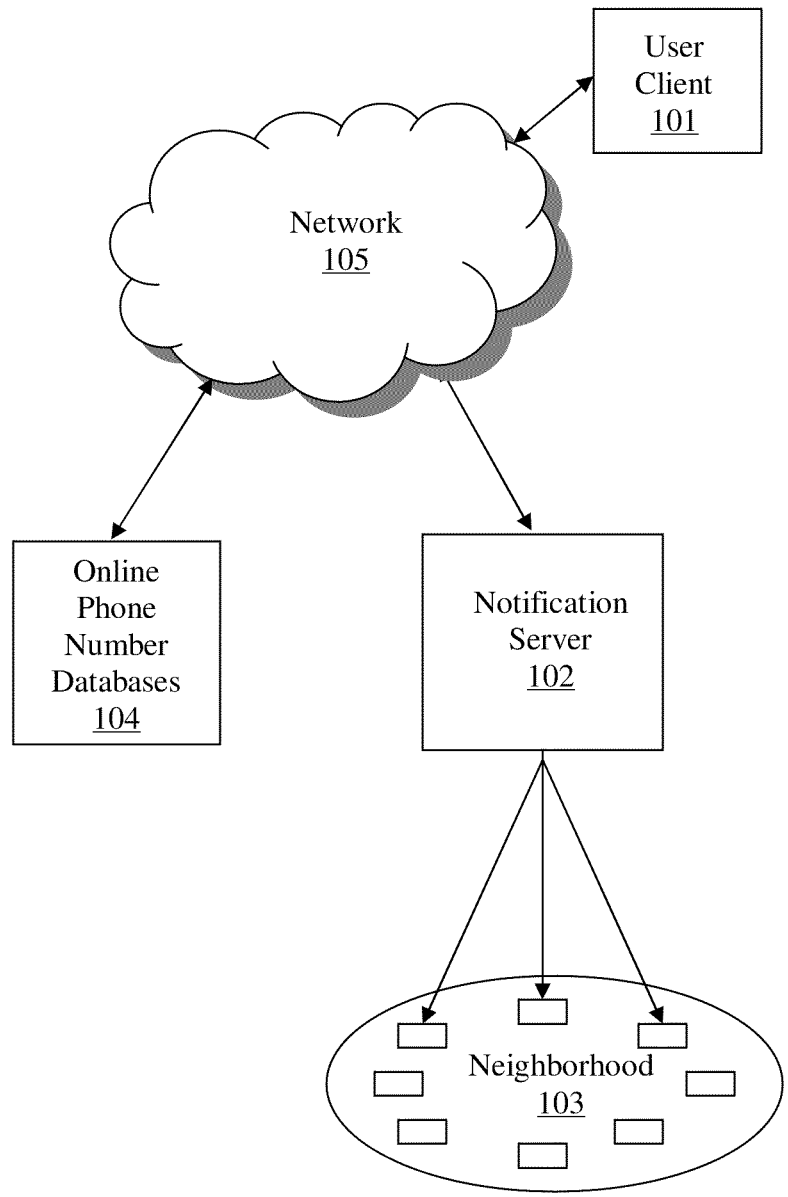
FIG. 1 is a block diagram that illustrates a mass notification service provider communicating across a network with a client device and phone number databases, according to an embodiment of the invention.

A mass notification system is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
   2.0 Mass Population Notification
   3.0 Implementation Mechanisms—Hardware Overview
   4.0 Extensions and Alternatives

---

1.0 General Overview

A method and system for mass population notification is described. In a possible embodiment, a user interface screen hosted by service allows the user to indicate a location in the proximity of where an item was lost. The user can also enter information describing his lost item and possibly upload a picture of the item.

The user is also allowed to select how many residents that he wants to notify about his lost item. The service charges the user a fee based on the number of residents that the user wants to contact or can charge a standard search fee. The user can pay the fee before the service begins contacting the residents or after the service has contacted the residents by using any type of payment system such as Paypal, a credit card, etc.

The service processes the user's item description and contact information to create a short voice message and/or text message to be delivered to the residents around the location where his item was lost. The voice message may be automatically created using a synthesized voice or manually using a human being's voice. The voice message may contain information about the user, his item's description, and his contact information or the service's contact information. The text message may also be created manually or automatically. The text message may contain information about the user, his item's description, a picture of the item, and his contact information or the service's contact information.

A map can be displayed to the user that graphically displays the area that is covered by the phone numbers found or an estimate of the phone number coverage selected by the user.

The foregoing outlines some of the salient features of the present invention. These features are illustrative of the main features of the invention; however there are additional features of the disclosed invention that will be apparent from the following description and drawings. In addition, many other benefits may be attained by applying or deploying the disclosed invention in a different manner.

2.0 Mass Population Notification

A possible embodiment allows a user to report lost, stolen, or missing items such as pets, people, objects, etc., to a service. The service obtains the user's contact information and, for a fee, reports the lost item to the user's neighbors or residents around the proximate location where the item was lost. The service automatically obtains phone numbers of neighbors that are in the user's neighborhood or residents around the location where the item was lost. Phone numbers can include: telephone numbers, voice over IP numbers, and cellular numbers. It then creates a voice message or text message that is customized to the user's lost item and contact information, informing the listener or the reader of the user's lost item and his contact information. An automatic dialing system dials the phone numbers of the user's neighbors or residents around the location where the item was lost and plays the voice message when the neighbor's phone is answered and/or sends a text message.

Figure 2:
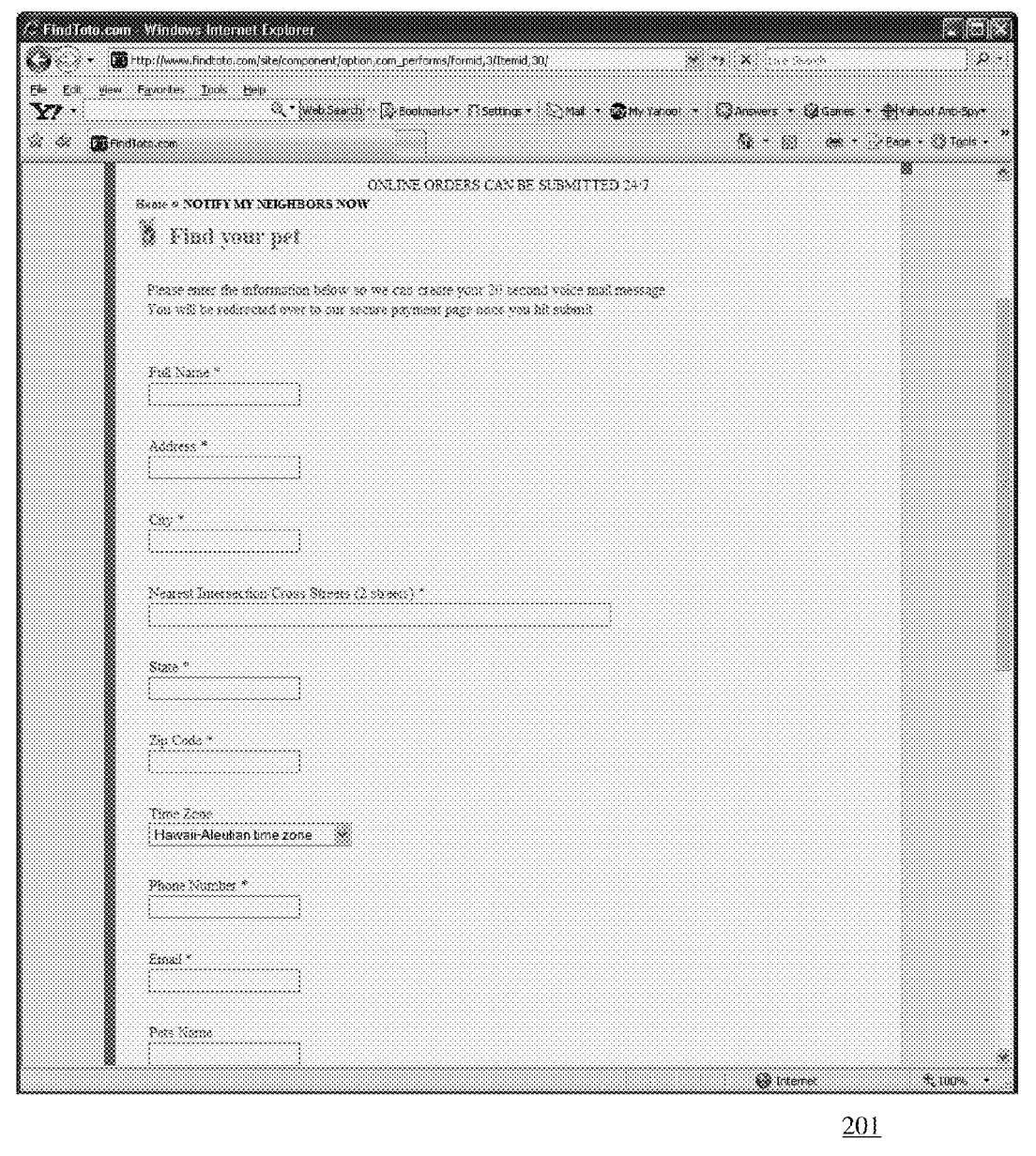
Figure 3:
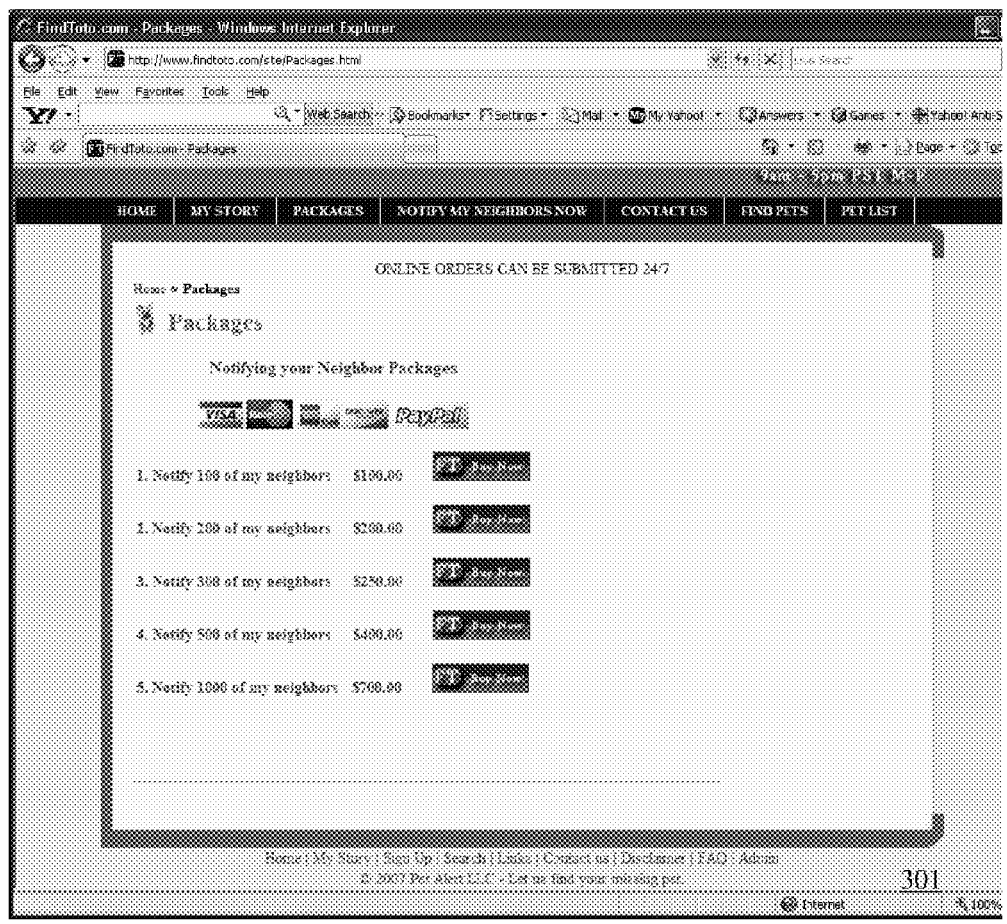
FIG. 3 is a block diagram that illustrates a user interface screen for entering a user's contact information, according to an embodiment of the invention.

Referring to FIGS. 1, 2, and 3, a possible embodiment involving a lost pet allows the user via his client system 101 that can be any of: a computer, a cell phone, a set-top box, etc., to enter his pet information (e.g., the pet's name, kind of pet, description of pet, date lost, last seen, etc.) and his contact information (e.g., name, address, best contact number, etc.) in a user interface screen 201. The user interface screen 201 hosted by service 102 and is accessible by the user's client system 101 via network 105. Network 105 may be the Internet or intranet, LAN, Wan, wireless network, etc. The user's client 101 can connect to the network 105 using any type of network communication link such as: cable, telephone, DSL, satellite, wireless, etc.

The user selects how many neighbors (when the pet has been lost in the user's own neighborhood) that he wants to notify about his missing pet on a user interface screen 301. The service 102 charges the user a fee based on the number of neighbors that the user wants to contact as shown in 301 or the service 102 can charge a standard search fee. The service 102 may be operating on a computing device such as a server. The user can pay the fee before the service begins contacting the user's neighbors by using any type of payment system such as Paypal, a credit card, etc.

In a possible embodiment, the user can select how many residents around the proximate location where his pet was lost that he wants to notify about his missing pet on a user interface screen 301. The service 102 charges the user a fee based on the number of residents that the user wants to contact, e.g., 100, 200, 300, 500, 100, or any user or service specified number, in the same manner as shown in 301 or the service 102 can charge a standard search fee. The user can pay the fee before the service begins contacting the residents by using any type of payment system such as Paypal, a credit card, etc.

Alternatively, the user can call the service 102 or go to a store front or office that the service operates to report the lost pet and supply the pet's information as well as the user's contact information.

The service 102 processes the user's pet and contact information to create a short voice message and/or text message to be delivered to his neighbors or the residents around the location where his pet was lost. The voice message may be automatically created using a synthesized voice or manually using a human being's voice. The voice message may contain information about the user, his pet's description, and his contact information or the service's contact information. The text message may also be created manually or automatically. The text message may contain information about the user, his pet's description, a picture of the pet, and his contact information or the service's contact information. The user's neighbors or the residents around the location where his pet was lost use the user's contact information or the service's contact information to respond to the user and notify him if the pet has been found or has been seen. In a possible embodiment, the service 102 stores all or some of the information entered by the user on one or more storage devices, such as a hard drive, solid state drive, RAM, etc.

The service 102 then processes the user's contact information to determine the user's neighborhood or the location where his pet was lost 103. The service 102 searches online phone number databases 104 for phone numbers of neighbors within the user's immediate area or around the location where his pet was lost. The service 102 sorts the phone numbers that it retrieved from the online phone databases 104 to locate the user-specified number of phone numbers. The service can locate the neighbors or residents that are closest in vicinity to the address that the user supplies. The service 102 starts from the address that the user has supplied and increases the search radius from that address outward until it finds at least the user-specified number of phone numbers to contact. An ordered list of phone numbers is created by the service 102. In a typical scenario, the number of phone numbers in the list has to be greater than the user-specified number because not all of the phone numbers found are valid and/or are answered by an answering machine, voice mail system, or human being. The service 102 can use GPS maps to determine its search patterns or any other mapping service. The service 102 may perform all of the functions described herein using one or more application programs running on a computer system such as a server.

Figure 4:
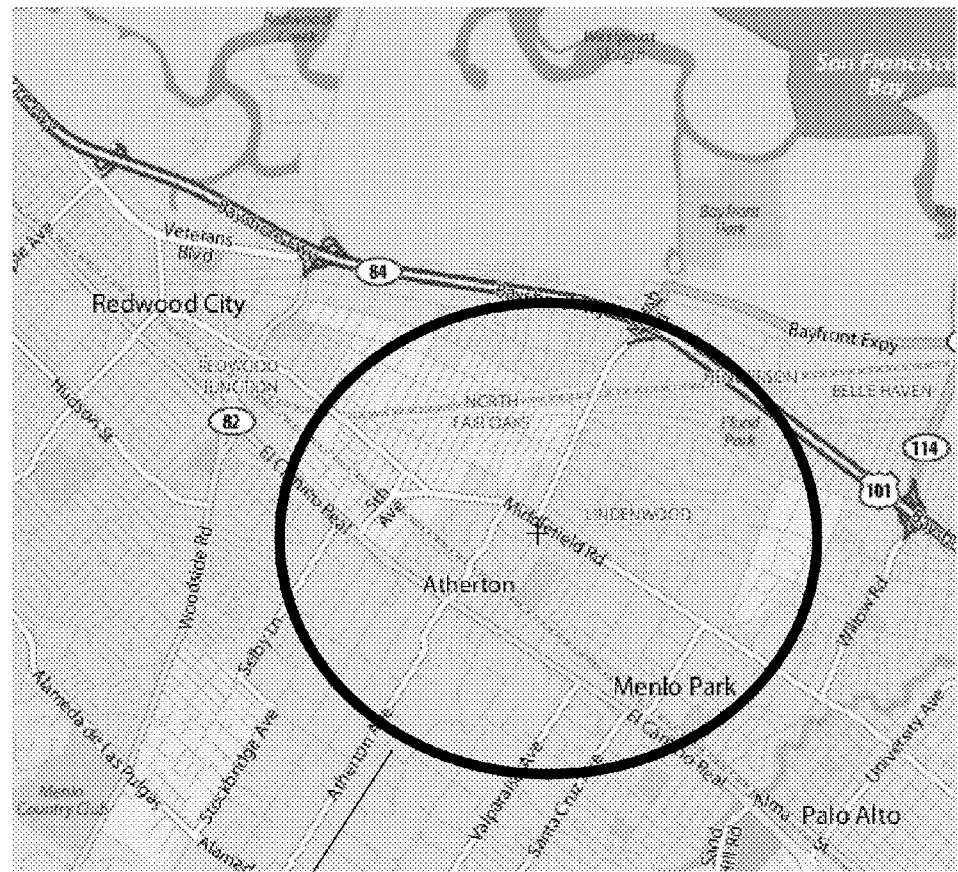
FIG. 4 is a block diagram that illustrates a search radius of an alert package, according to an embodiment of the invention.

Referring to FIG. 4, given that a pet does not stay within city or county borders, the service does not limit the coverage area or radius of the phone number search to such borders. In a possible embodiment, the user is presented with a map 401 that displays the area that is covered by the phone numbers found or an estimate of the phone number coverage 402. The service 102 can display an estimated coverage area using a circular pattern as shown in 402 depicted as a circle or a shaded circular region using the outermost addresses associated with the phone numbers to estimate the borders of the circular region. Alternatively, the service 102 can create an actual coverage display using the outermost addresses of the phone numbers. It can show the user a shaded area that covers the area defined by the set of phone numbers. The user can select a larger number of phone numbers to increase the size of the search area or decrease the number of phone numbers to decrease the size of the search area. The map 401 can display the search area dynamically as the user selects the number of phone numbers and shows the user the size of the search area in relation to the number of phone numbers selected. Alternatively, the map can be selected to be displayed by the user after he selects the number of phone numbers. When the user is satisfied with the size of the search area, he may complete the purchase of the search package as described above.

The service 102 uses an automatic dialer that dials each phone number in the ordered list and plays the voice message when as each phone number is answered. The service 102 counts the number of phone numbers that have been answered and stops contacting phone numbers when the user-specified number of neighbors have been contacted.

A possible embodiment can be extended to cover missing persons, lost objects, local or area events (e.g., charity/fundraising events in the local area, corporate events, realtor events, etc.), etc. Neighbors or residents can be notified using any of: phone calls, direct mailers (e.g., "have you seen me" mailings), or door to door contact. The service 102 can search online databases for home addresses and can generate a list or map of home addresses for human beings to knock on doors of neighbors or residents to inform them of the lost pet, missing person, lost item, or event. The lists of home addresses may also be used for the mailing of notifications to neighbors or residents.

The messages can include: the user's contact information, who or what was lost (along with a description), or a description of an event.

A possible embodiment alerts neighbors or residents using a cable company's menu system, satellite broadcaster, or local broadcaster's audio or video system. A lost pet's owner can, for example, purchase a lost, found, or stolen pet listing to be viewable on the cable system by viewers in an interactive part of an on demand or a TV menu system. The viewers can be determined by the local cable company. The local cable company knows the serial numbers of the set top boxes for each viewer. The local cable company can make the listing viewable by select viewers using the set top box serial numbers or other set top box identifying information. The local cable company or a service can charge the lost pet's owner a fee for the number of set top boxes that have access to the listing or can charge the lost item's owner a set fee for a set radius of simply a listing fee.

The lost pet's owner can provide the local cable company the pet's information such as a description and/or picture, and the owner's contact information so the cable company can then contact the lost pet owner via email, phone, etc. The owner can provide this information using a client that interfaces with a local cable company's web site that allows the information to be entered and fee to be paid much like the method described above. Alternatively, the owner can provide the information over the telephone and/or via email. The viewers can see the pet's description and/or picture on the lost, found, or stolen pet listing and contact the local cable company via telephone or email. The local cable company can allow the owner to add a photo or update the status of his lost, stolen, or found pet listing. The owner can click on a link in an email from the local cable company to upload his pet's photo or update his listing information. Note that the satellite broadcaster or local broadcaster can perform the same viewer determination as the local cable company.

In addition, pet breeding companies can sell pets on these types of menu systems or locate a breeder in a potential buyer's area.

Note that, although pets have been described above relating to lost items, other lost items such as people, objects, etc., can be substituted in place of pets in the discussions of possible embodiments above.

3.0 Implementation Mechanisms—Hardware Overview

Figure 5:
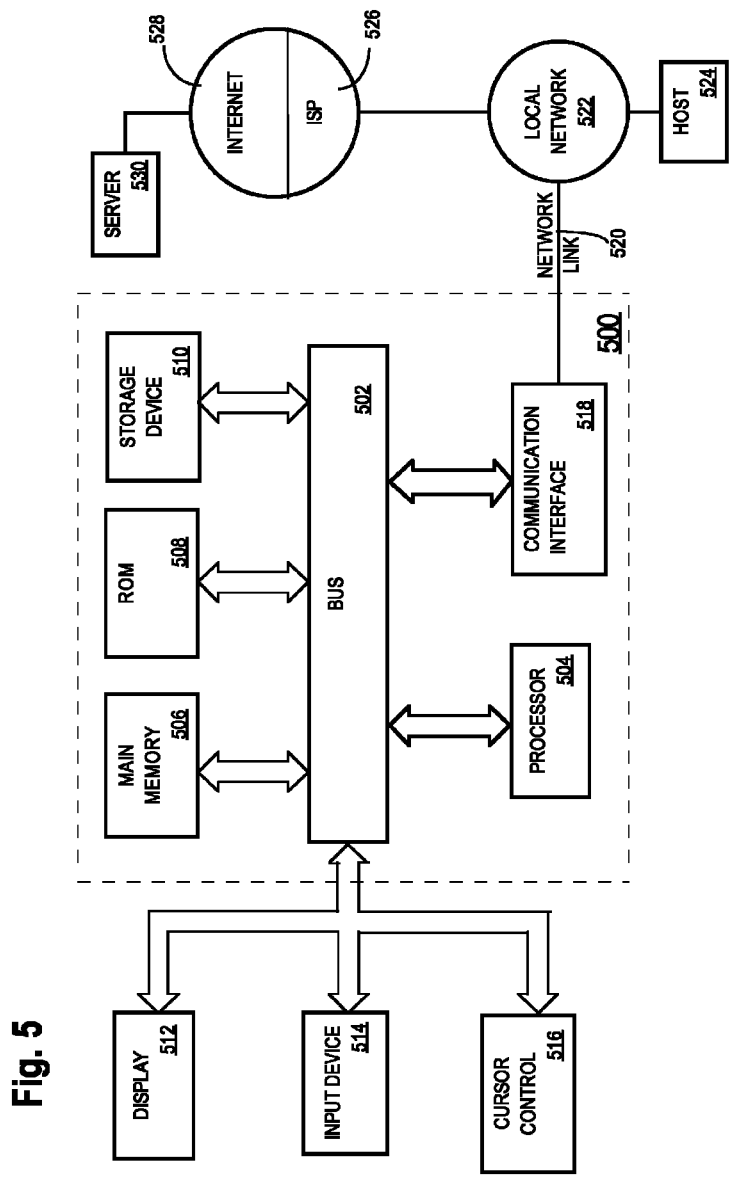
FIG. 5 is a block diagram that illustrates a computer system upon which an embodiment may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory ("RAM") or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory ("ROM") 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 505 to a display 512, such as a cathode ray tube ("CRT"), for displaying information to a computer user. An input device 514, including alphanumeric and other keys, is coupled to bus 502 for communicating information and command selections to processor 504. Another type of user input device is cursor control 516, such as a mouse, trackball, stylus, or cursor direction keys for communicating direction information and command selections to processor 402 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for electronic commerce and brokering. According to one embodiment of the invention, an electronic commerce and brokering system is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network ("ISDN") card or a modem to provide a data communication connection to a corresponding type of telephone line. As another example, communication interface 518 may be a local area network ("LAN") card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider ("ISP") 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for controlling document access using centrally managed rules as described herein.

The received code may be executed by processor 504 as it is received, and/or stored in storage device 510, or other non-volatile storage for later execution. In this manner, computer system 500 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of mass population notification of a lost item, the method comprising:
    displaying a menu to a user, the menu displaying at least a list of at least two menu items, each menu item in the list displaying at least: (1) a specific number of residents or phone numbers to be contacted by the service in a vicinity of a specified location where an item was lost and (2) an associated fee to be paid to the service to contact the specific number of residents or phone numbers;
    receiving user input including at least a selection of a menu item from the list of at least two menu items, the selected menu item having an associated specified number of residents or phone numbers in the vicinity of the specified location to be contacted;
    in response to receiving the user input, automatically determining a set of phone numbers within an area around the location from at least one online phone number database, the set of phone numbers is of a size that is equal to or greater than containing at least the specified number of residents or phone numbers in the vicinity of the specified location;
    creating an audio and/or text message containing information regarding the lost item; and
    sending the audio and/or text message to the set of phone numbers.

2. The method of claim 1, wherein the receiving step receives information describing the lost item.

3. The method of claim 1, wherein the receiving step receives contact information of an owner of the lost item.

4. The method of claim 2, wherein the creating step includes the information describing the lost item in the audio and/or text message.

5. The method of claim 3, wherein the creating step includes the contact information in the audio and/or text message.

6. The method of claim 1, wherein the determining step receives a number defining a size of the set of phone numbers.

7. The method of claim 1, wherein the determining step searches online phone number databases for the set of phone numbers within the area around the location.

8. The method of claim 1, wherein the service charges a user a fee associated with the selected menu item for the sending the audio and/or text message to the set of phone numbers.

9. The method of claim 8, wherein the fee is determined by a number of phone numbers in the set of phone numbers.

10. The method of claim 1, further comprising: displaying a map showing a coverage area of the set of phone numbers within the area around the location.

11. A non-transitory computer-readable medium carrying one or more sequences of instructions for mass population notification of lost items, which instructions, when executed by one or more processors, cause the one or more processors to carry out the steps of:
    displaying a menu to a user, the menu displaying at least a list of at least two menu items, each menu item in the list displaying at least: (1) a specific number of residents or phone numbers to be contacted by the service in a vicinity of a specified location where an item was lost and (2) an associated fee to be paid to the service to contact the specific number of residents or phone numbers;
    receiving user input including at least a selection of a menu item from the list of at least two menu items, the selected menu item having an associated specified number of residents or phone numbers in the vicinity of the specified location to be contacted;
    in response to receiving the user input, automatically determining a set of phone numbers within an area around the location from at least one online phone number database, the set of phone numbers is of a size that is equal to or greater than containing at least the specified number of residents or phone numbers in the vicinity of the specified location;
    creating an audio and/or text message containing information regarding the lost item; and
    sending the audio and/or text message to the set of phone numbers.

12. The computer-readable medium of claim 11, wherein the receiving step receives information describing the lost item.

13. The computer-readable medium of claim 11, wherein the receiving step receives contact information of an owner of the lost item.

14. The computer-readable medium of claim 12, wherein the creating step includes the information describing the lost item in the audio and/or text message.

15. The computer-readable medium of claim 13, wherein the creating step includes the contact information in the audio and/or text message.

16. The computer-readable medium of claim 11, wherein the determining step receives a number defining a size of the set of phone numbers.

17. The computer-readable medium of claim 11, wherein the determining step searches online phone number databases for the set of phone numbers within the area around the location.

18. The computer-readable medium of claim 11, wherein the service charges a user a fee associated with the selected menu item for the sending the audio and/or text message to the set of phone numbers.

19. The computer-readable medium of claim 18, wherein the fee is determined by a number of phone numbers in the set of phone numbers.

20. The computer-readable medium of claim 11, further comprising: displaying a map showing a coverage area of the set of phone numbers within the area around the location.

* * * * *

UNITED STATES PATENT AND TRADEMARK OFFICE
CERTIFICATE OF CORRECTION

PATENT NO. : 8,600,357 B2  
APPLICATION NO. : 12/262026  
DATED : December 3, 2013  
INVENTOR(S) : Dustin J. Sterlino It is certified that error appears in the above-identified patent and that said Letters Patent is hereby corrected as shown below:

In the Claims:

Claim 1, Column 7, Line 57: Please delete "containing at least".
Claim 11, Column 8, Line 42: Please delete "containing at least".

Signed and Sealed this
Fifteenth Day of April, 2014

Michelle K. Lee
*Deputy Director of the United States Patent and Trademark Office*